(12) United States Patent
Kivela et al.

(10) Patent No.: US 7,937,459 B2
(45) Date of Patent: May 3, 2011

(54) METHOD AND SYSTEM FOR COLLECTING COUNTER DATA IN A NETWORK ELEMENT

(75) Inventors: Pasi Kivela, Lempäälä (FI); Mikko Kuikka, Jyväskylä (FI)

(73) Assignee: Nokia Corporation, Espoo (FI)

( * ) Notice: Subject to any disclaimer, the term of this patent is extended or adjusted under 35 U.S.C. 154(b) by 1118 days.

(21) Appl. No.: 10/854,717

(22) Filed: May 27, 2004

(65) Prior Publication Data

US 2004/0228462 A1 Nov. 18, 2004

Related U.S. Application Data

(63) Continuation of application No. PCT/FI02/00768, filed on Sep. 25, 2002.

(30) Foreign Application Priority Data

Dec. 13, 2001 (FI) .................................. 20012464

(51) Int. Cl.
*G06F 15/173* (2006.01)
(52) U.S. Cl. ........ 709/223; 709/224; 379/112; 455/407; 455/410
(58) Field of Classification Search .................. 455/410, 455/407; 709/224, 223; 379/112
See application file for complete search history.

(56) References Cited

U.S. PATENT DOCUMENTS

| | | | | |
|---|---|---|---|---|
| 4,625,081 A | * | 11/1986 | Lotito et al. | 379/88.26 |
| 4,985,826 A | * | 1/1991 | Jonsson et al. | 712/235 |
| 5,592,620 A | * | 1/1997 | Chen et al. | 709/223 |
| 5,625,669 A | * | 4/1997 | McGregor et al. | 340/58 |
| 5,790,525 A | * | 8/1998 | Ono et al. | 370/244 |
| 5,794,217 A | * | 8/1998 | Allen | 705/27 |
| 5,859,899 A | * | 1/1999 | Sakai et al. | 379/92.01 |
| 6,085,264 A | * | 7/2000 | Katoh | 710/59 |
| 6,246,752 B1 | * | 6/2001 | Bscheider et al. | 379/88.22 |
| 6,338,046 B1 | * | 1/2002 | Saari et al. | 705/34 |
| 6,522,939 B1 | * | 2/2003 | Strauch et al. | 700/116 |
| 6,625,266 B1 | * | 9/2003 | Saari et al. | 379/112.01 |
| 7,225,249 B1 | * | 5/2007 | Barry et al. | 709/227 |
| 2003/0036974 A1 | * | 2/2003 | Allen | 705/27 |
| 2003/0197632 A1 | * | 10/2003 | Rubin et al. | 341/141 |

FOREIGN PATENT DOCUMENTS

| | | |
|---|---|---|
| WO | WO 98/09235 | 3/1998 |
| WO | WO 9934623 A1 * | 7/1999 |
| WO | WO 99/53703 | 10/1999 |
| WO | WO-01/05126 A1 | 1/2001 |
| WO | WO 01/05126 A1 | 1/2001 |

* cited by examiner

*Primary Examiner* — Krista M Zele
*Assistant Examiner* — O. C. Vostal
(74) *Attorney, Agent, or Firm* — Harrington & Smith

(57) ABSTRACT

The invention relates to a method and a system for collecting counter data from a set of counters in a network element. According to the present invention, the updating block updates an accounting file, and the changed counter data is collected from said accounting file by a centralized counter handling block for writing into a transfer file. The collecting of said counter data is controlled using collecting information from a control file, wherein the specific counters are to be taken into account by changing said information in said control file. Information in said control file also specifies the user interface by specifying the format of the counter data which is to be written to the transfer file.

21 Claims, 4 Drawing Sheets

| length_of_data (W) | service_id (B) | nbr_of_updated_sets (b) | rec (DW) | nbr_of_cntrs (B) | counter value (DW) | counter value (B) | counter value (DW) |
|---|---|---|---|---|---|---|---|
| | | | rec (DW) | nbr_of_cntrs (B) | counter value (DW) | | |

Fig. 5

| length_of_data (W) | service_id (B) | nbr_of_updated_sets (b) | rec (DW) | subrec (DW) | nbr_of_cntrs (B) | counter value (DW) | counter value (B) | counter value (DW) |
|---|---|---|---|---|---|---|---|---|
| | | | rec (DW) | subrec (DW) | nbr_of_cntrs (B) | counter value (DW) | | |

Fig. 6

| length_of_data (W) | service_id (B) | nbr_of_updated_sets (b) | rec (DW) | subrec (DW) | sub_subrec (DW) | nbr_of_cntrs (B) | counter value (DW) | counter value (B) | counter value (DW) |
|---|---|---|---|---|---|---|---|---|---|
| | | | rec (DW) | subrec (DW) | sub_subrec (DW) | nbr_of_cntrs (B) | counter value (DW) | | |

Fig. 7

METHOD AND SYSTEM FOR COLLECTING COUNTER DATA IN A NETWORK ELEMENT

REFERENCE TO RELATED APPLICATIONS

This is a Continuation of International Application No. PCT/FI02/00768 filed Sep. 25, 2002, which designated the U.S. and was published under PCT Article 21(2) in English.

FIELD OF THE INVENTION

The present invention relates to telecommunication systems. In particular, the present invention relates to a novel and improved method and system for collecting counter data from a set of counters in a network element.

BACKGROUND OF THE INVENTION

The general structure of a network element may be divided into three main parts. There is a control part which may be constituted by the different computer units interconnected by an internal message bus. There is also a network interface part which comprises the access and trunk network interfaces. The network interface part is intended to interface the network element to another network element and to the user or users. Further, there may be a switching part which implements the connections between the different lines and/or trunk circuits. This general structure is only one example of the network element and it is derived from the structure of the conventional telephone exchange.

In the above example, counters or so-called memory banks may be used for saving or recording data about various parts or functions of the telephone exchange or network element. Traditionally, counters have been used in the telephone exchange for billing purposes between the operators. Despite the fact that the subscriber billing at present is fully based on CDR's (Call Detailed Record, CDR), the need for counters has not decreased.

Typically a telephone exchange, for example, records different counters which are directed or allocated to the same unique address. Examples of the addresses are a subscriber, a bus, a connection, an IP-address, a pair of virtual paths/virtual channels etc.

One example of the present counter handling in the telephone exchange is described in FIG. 1. The charging program in different charging units (CHU, Charging Unit) sends a plurality of updating messages to updating block (AUPPRB) in a master charging unit (CHU-1). Data from the updating block is written out from the charging unit by using a logical file CHSAVE. The updating of the counters cannot be divided into different charging units, which means that traffic load between different charging units is heavy. To add new counters to this structure is almost impossible. Also the updating block and the logical file are quite fixed in the platform software in the network element making them difficult to change.

Operators or other users of network elements usually have different needs or uses for counters which are to be recorded. In some situations, there may be a need for summing up a set of counters or collect all of the counters separately and obtain the specific information of the counters afterwards. It is not reasonable to combine traditional counter information and call detailed records, and it is not always even possible. It is more preferable to preserve the counters for different kind of information from the call detailed records.

In the future there might even be some network elements which do not generate call detailed records at all. As an example of this kind of network element let it be mentioned the service routing register (SRR, Service Routing Register), which provides a mobile number portability (MNP, Mobile Number Portability), and the media gateway (MG, Media Gateway), which provides a gateway solution between different protocols or networks.

In these network elements, the counters may be used, e.g. for counting the number of IP packets or for the billing between the Internet service providers. However, the known methods do not provide any tools for the operators or users of the network elements or counters to modify the data recorded on the counters or the way of updating or retrieving the changed data from the counters. At present, the counter data is collected separately and output via a logical file. All the operations and functions relating to the counters have been hard coded in the network element, and changing the handling of counters or specifying a new counter by the operator has been difficult or even impossible. Usually a small change to the counter handling process has required a lot of changes in the whole platform software in the network element or the telephone exchange. Thus, the operators and other users of network elements have found it inefficient and useless to handle the counters.

Thus, there is an increasing need for a dynamic counter handling process so that the process may be specified on product line basis or even on operator basis. There is also a need for such a counter handling process that does not load the internal message bus too much.

SUMMARY OF THE INVENTION

Consequently, the present invention concerns a counter data collecting system and method which substantially obviates one or more of the limitations and disadvantages of the related art.

One objective of the present invention is to provide a dynamic and generic counter data acquiring system and method. Specifically, unlike conventional counter data handling, which is hard coded in each network element, the present invention is designed as easy to use and manage bearing in mind the end user's point of view.

Another objective of the present invention is to provide a new counter architecture which provides an easy way to add new counters and to provide customer- or operator detailed counters only by changing the information in the specific file or files without changing the whole platform software in the network element.

This is achieved by means of a method for collecting or acquiring counter data from a set of counters in a network element. The network element may be a local exchange (LE, Local Exchange), mobile switching center (MSC, Mobile Switching Center), call processing server (CPS, Call Processing Server), media gateway (MG, Media Gateway) or service routing register (SRR, Service Routing Register). In the method, application-specific data is recorded on the set of counters and an updating message is sent from an application to an updating block which updates the changed data of said set of counters. The updating block may be any program or process which is arranged to receive the updating message and to update a memory or file accordingly. Finally said counter data is written from said set of counters into a transfer file for further handling of said data. The transfer file may be any logical file which has a predetermined structure and which can be updated dynamically.

According to the present invention, the updating block updates an accounting file, and the changed counter data is collected from said accounting file by a centralised counter handling block for writing into said transfer file. The collecting of said counter data is controlled using collecting information from a control file, wherein the specific counters are to be taken into account by changing said information in said control file. Information in said control file also specifies the user interface by specifying the format of the counter data which is to be written to the transfer file.

Before the application sends the first updating message it has to send a service request to the updating block. On the basis of the service request, the updating block reserves a resource or a process which is responsible for serving this application. The service request includes parameters which define the environment in which the application works and needs the updating service. The parameters are, e.g. the identity of the application, the number of indexes for counters, the number of counters in said set of counters and the assignment of indexes in the counting file. After the service request has been received in the updating block, it creates or reserves a resource for the application that requested the updating service. After the resource has been successfully reserved, it sends an acknowledgement message to the application in order to inform the application of the correct serving resource.

The resource creates an accounting file which has a data structure depending on the information in the service request. The resource may filter the counter information from the updating message and write only a selected group of counters into the accounting file. This filtering is controlled by filtering information in a filter file.

According to another aspect, the invention relates to a system for collecting counter data from a set of counters in a network element. The network element comprises an application including a set of counters for recording application-specific data.

The application may be any computer or charging unit which is designed for specific tracking or tracing tasks in the network element. Also the network element comprises a backup and transfer block for writing recorded counter data from said set of counters into a transfer file for further handling of said data and for making a backup of a counter data. According to the invention, the system further comprises an accounting memory for updating an accounting file according to an updating message from the application and a centralised counter handling block for collecting counter data from said accounting file for writing into said transfer file. The system further comprises a control memory for saving control information. The control memory has been linked with the centralised counter handling block in order to provide control information for controlling the operation of the counter handling block.

In one embodiment of the invention, the updating block includes at least one resource which is responsible for updating changed counter data of the specific application that requested the updating service from the updating block. The system may also comprise a backup memory for saving and updating a compiled counter file which is for making a backup of used counters. The system further comprises a set of updating blocks which have been connected to said centralised counter handling block for collecting all counter data from all applications in the network element.

The invention provides an easy way to add and offer new and customer-specific counters only by changing information in the control file. This may be implemented without the necessity of changing the platform software in the network unit. The invention also provides a dynamic and generic way to handle the set of counters in the network element. This makes it possible for the operator to collect different kind of data from different parts of a network element much easier than in the present systems. Thanks to the invention, a dynamic counter handling process may also be used in the future network elements, and the counter handling may be dynamically changed even at the very late stage of the production line.

Also the memory load of charging unit decreases because the counter files are allocated dynamically. In the updating process, it is not necessary to know the structure of counter files or the number of updating messages beforehand. The updating messages are defined by product lines, only the structure of message is defined by platform software.

BRIEF DESCRIPTION OF THE DRAWINGS

The accompanying drawings, which are included to provide a further understanding of the invention and constitute a part of this specification, illustrate embodiments of the invention and together with the description help to explain the principles of the invention. In the drawings.

DETAILED DESCRIPTION OF THE INVENTION

Reference will now be made in detail to the embodiments of the present invention, examples of which are illustrated in the accompanying drawings.

Figure 1:
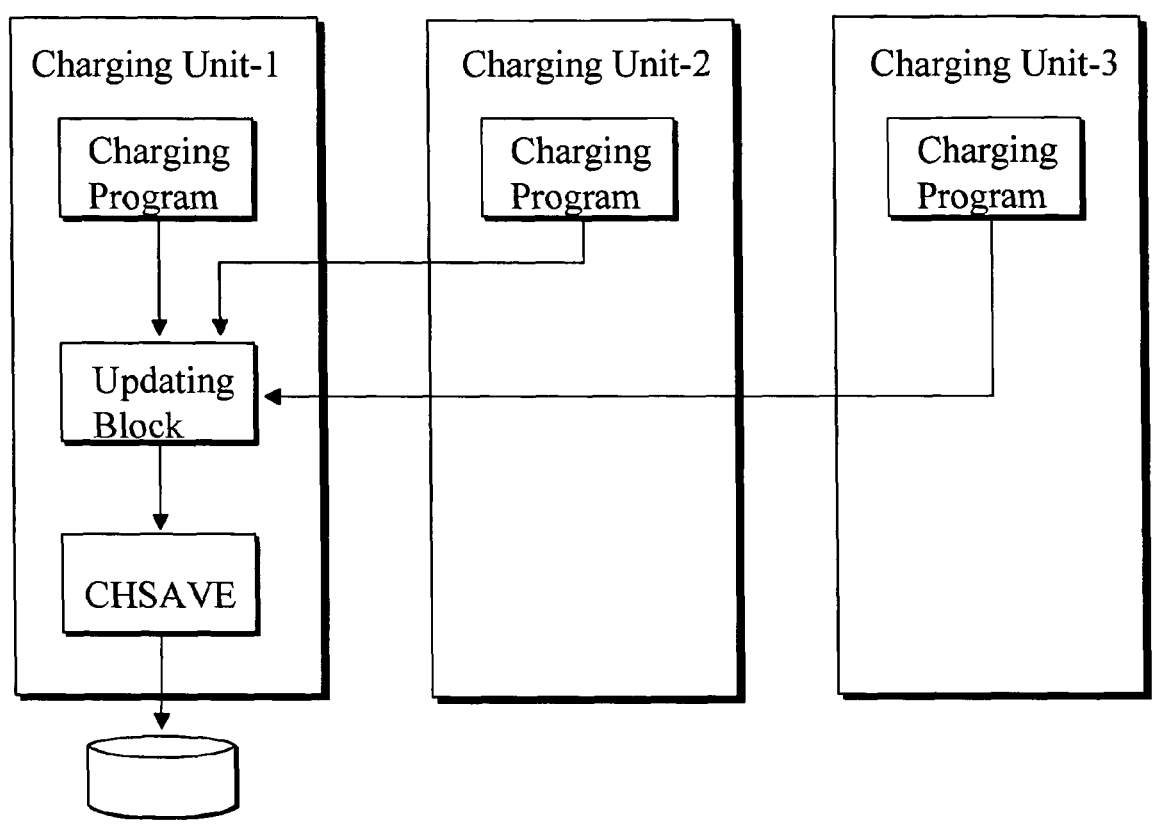
FIG. 1 is a block diagram illustrating a prior-art solution for collecting the counter data.
Figure 2:
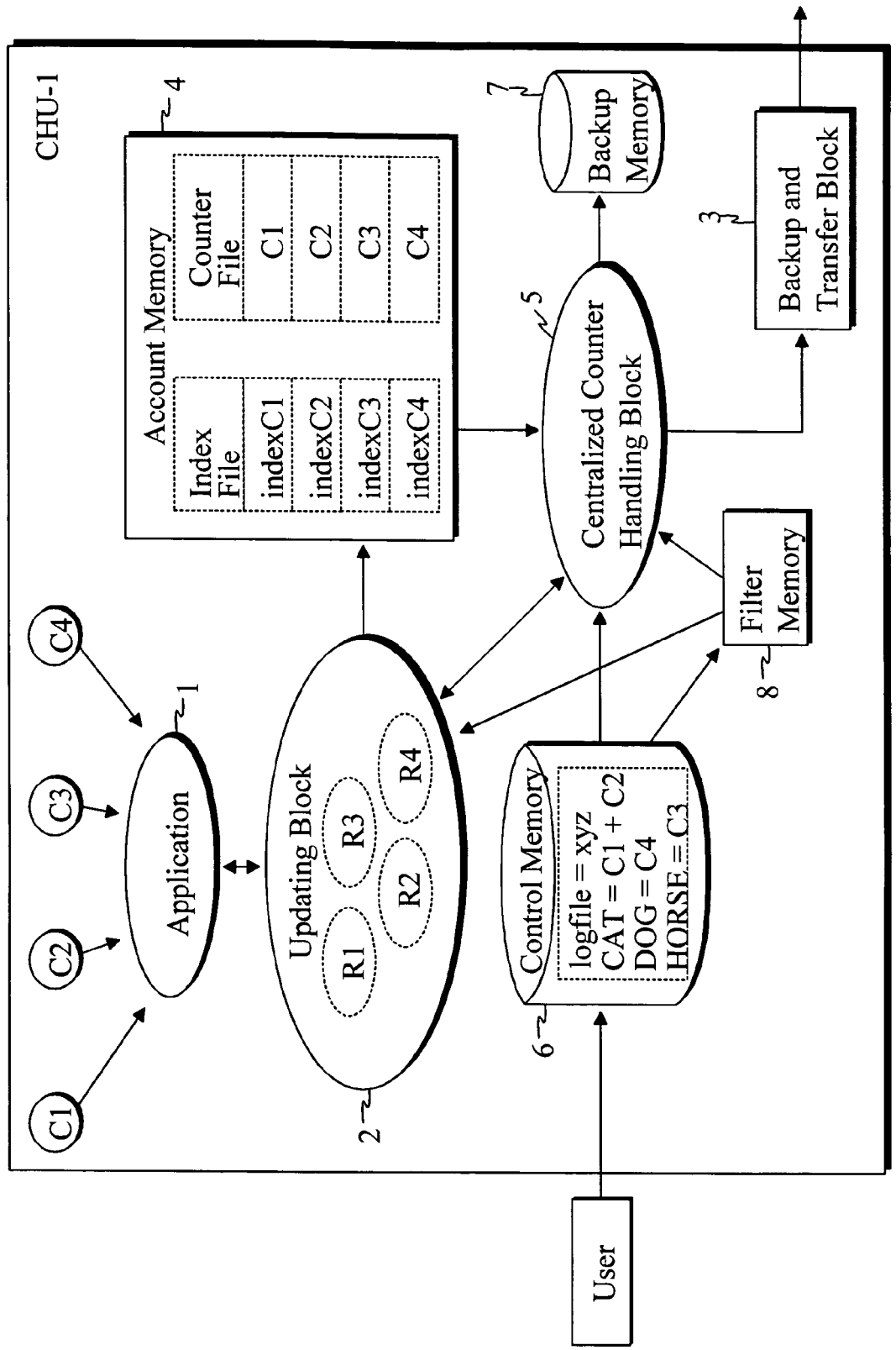
FIG. 2 is a block diagram of one embodiment of the present invention.

As shown in FIG. 2, the system for collecting the counter data from the set of counters according to one embodiment of the present invention comprises an application 1 including a set of counters C1, C2, C3, C4 for recording application-specific data. The application may receive control commands via a MML interface (MML, Man Machine Language) (not shown), and the tasks of the application may be specified according to the network element in which it is located. The examples from tasks may be derived, e.g. from the telephone exchange. The system of FIG. 2 further comprises an updating block 2 for updating changed counter data and a backup and transfer block 3 for writing said recorded counter data from said set of counters into a transfer file for further handling of data.

In the system of FIG. 2, the accounting memory 4 for updating the accounting file according to an updating message from application 1 is preferably a volatile memory (e.g. Random Access Memory, RAM). It is connected to the updating block 2 and to the centralised counter handling block 5 which collects updated counter data from the accounting memory and writes it further into the transfer file. As shown by FIG. 2, the accounting memory 4 includes an accounting file which has a data structure as defined in the service request of said application. The accounting file may have a two-part file structure which comprises an index file and a memory file, wherein said index file identifies the contents of said memory file. However, it is to be noted that this is only one example of the dynamic allocation of the accounting memory, and other allocation schemes may be used in the present invention.

The system of FIG. 2 further comprises a control memory 6 for saving control information. Control information is for controlling at least the time interval for collecting data from the account memory 4 and the format of displayed counter data by means of which the centralised counter handling block 5 writes information into the transfer file. The Control memory 6 is linked with the centralised counter handling block 5 and is preferably a non-volatile memory, e.g. a hard disk.

Figure 3:
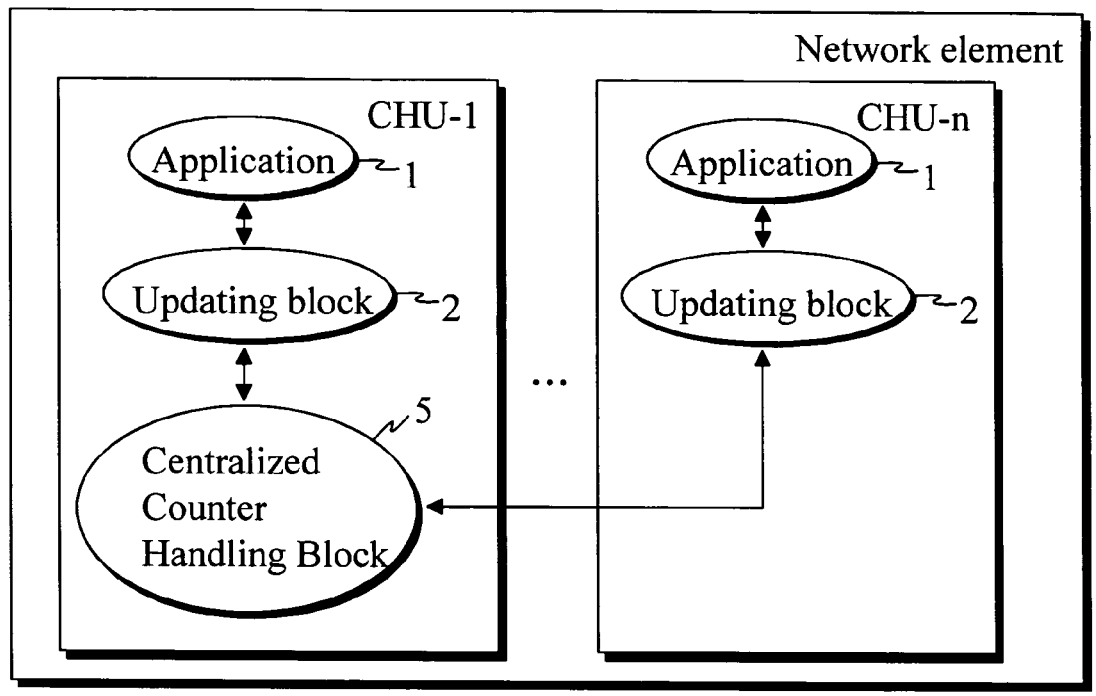
FIG. 3 is a block diagram of one embodiment of the present invention.

In the example of FIG. 2, the updating block 4 includes four resources R1, R2, R3, R4, which are responsible for updating the changed counter data of the applications 1 which requested the updating service from said updating block 2. FIG. 3 represents a decentralised system in which the updating block 2 has been connected to the centralised counter handling block 5 of the master charging unit. In the example of FIG. 3, only two charging units CHU-1 and CHU-n are presented. Nevertheless, it is obvious that there may be a number of charging units in one network element. In the example of FIG. 3, the first resource R1 is responsible for the application in the master charging unit CHU-1 and the second resource R2 is responsible for the application in the charging unit CHU-n.

In one embodiment of the present invention, the system further comprises a backup memory 7 for saving and updating the compiled counter file which is for making a backup of used counters C1, C2, C3, C4. This is important because the accounting memory 4 is volatile for practical reasons and is swept away if the network element suddenly resets. Data writing into the account memory is further controlled or filtered using filter information in a filter memory 8. Filter information informs the resource of the counters which are ignored and which are updated on the account memory 4. This gives more flexibility and dynamics to the handing of counters in the network element. In one embodiment, the filter memory 8 is connected to the control memory 6 wherein the user is able to control the contents of the filter memory 8.

Figure 4:
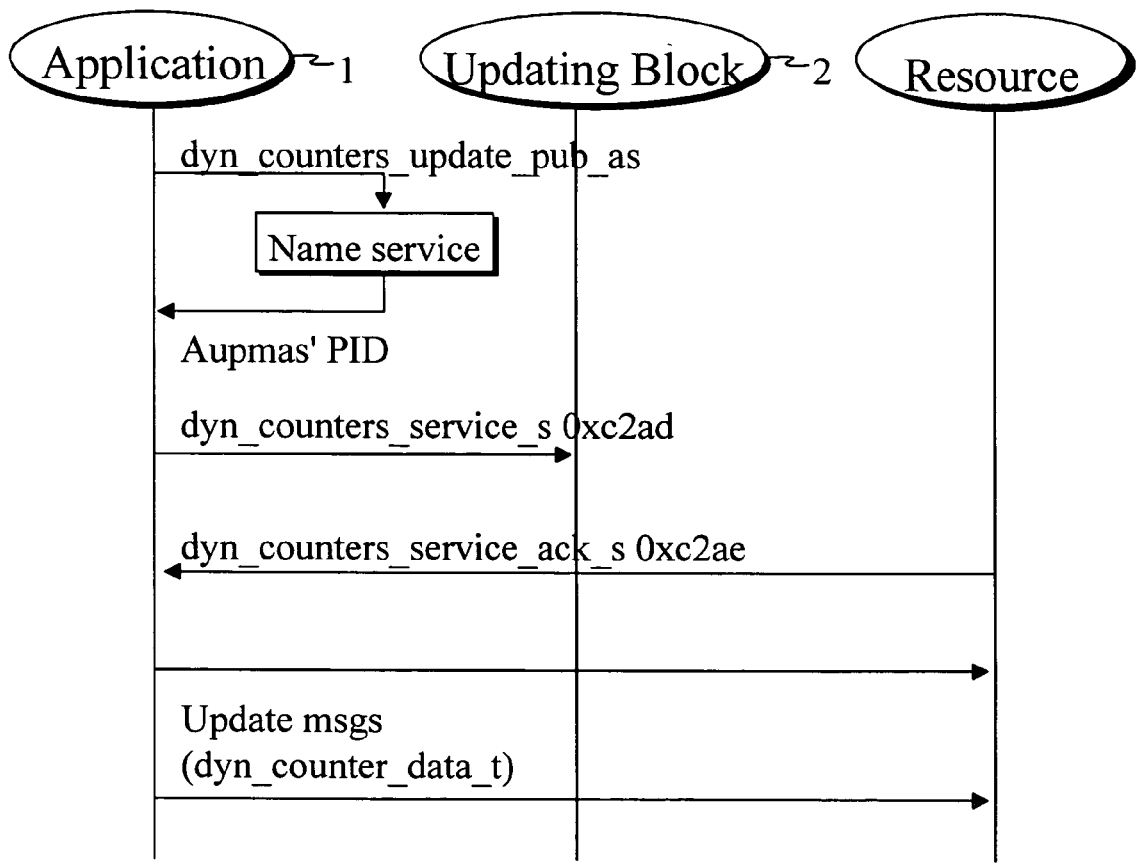
FIG. 4 is a signalling diagram describing the initialisation of the updating service according to one embodiment of the present invention, and FIGS. 5-7 describe the structure of the service request according to one embodiment of the present invention.

FIG. 4 represents a signalling scheme concerning the initialisation of a counter updating process according to one embodiment of the present invention. An application which needs the update service requests the ID of the updating block which is responsible for serving the application. The ID-query is made from name server (Name service). After the query the application sends a service request message (dyn_counters_service_s 0xc2ad) to the master process of updating block 2. The updating block 2 reserves a resource R according to the requested service. After the resource has been successfully reserved the resource sends an acknowledgement message (dyn_counters_service_ack_s 0xc2ae) back to the application. After the initialisation the application is ready to send, and the updating block is ready to receive updating messages (dyn_counter_data_t).

FIGS. 5-7 represent three different update messages according to one embodiment of the present invention. The messages differ from each other only by the number of index fields. In the message of FIG. 5 there is only one index field rec (DW), in the message of FIG. 6 there is one additional sub-index field subrec (DWD) and in the message of FIG. 7 there are two additional sub-index fields subrec (DW) and sub_subrec (DW). The number of indexes specifies dimensions of an assignment which is in use. The message of FIG. 5 uses one-dimensional assignment, the message of FIG. 6 uses two-dimensional assignment and the message of FIG. 7 uses three-dimensional assignment. The application itself sends these dynamic updating messages to the correct resource of the updating block. The updating block does not know beforehand the number of updating messages and the number of counters to be updated. As shown by FIGS. 5-7, the structure of updating messages depends on the used assignment dimensions. It is to be noted that this is only one example of the possible updating messages and depends highly on the specific environment where the invention is in use.

Referring back to FIG. 2, one method for collecting counter data from a set of counters according to one embodiment of the present invention is now described. After the initialisation process, which was described referring to FIG. 4, the application sends counter updating messages directly to the correct resource R1, R2, R3 or R4. The counter updating messages are defined by the application, and just the structure of messages has to be correct. This means that the updating block 2 does not know beforehand the number of counter updating messages to be received or the fact of how many counters have to be updated. The updating block 2 updates only the indexes which are defined to be updated. The information about the indexes to be updated updating block 2 receives from the filter memory 8. The updating block 2 updates changed counter data on the account memory 4. In this example, the account file in the account memory 4 has been divided into two files, the index file and the counter file. In the index file there is the offset of the unique counter in a counter file, and the index file is ordered according to the indexes sent by application 1 in the updating message.

The centralised counter handling block 5 has a control file which is located in the control memory 6. On the control file the user can create different mathematical operations for counters and give specific names to them to change the user interface according to the application environment. For instance in FIG. 2 control file includes information of logical file (logfil=xyz) which is to be used by backup and transfer block for writing updated counter data for further handling of said data. There is also a sum operation c1+c2 defined that has the name CAT (CAT=c1+c2). Counters c3 and c4 have the names HORSE and DOG. The information contents in the control memory may be updated by the user using the user interface in the network element.

According to the time interval defined in the control file the centralised counter handling block 5 requests counters from the updating block 2. A response to this request is received, and by this response the account file is transferred to the centralised counter handling block 5. The centralised counter handling block 5 updates only the used counters on the backup memory 7 according to information in the control memory. It is possible to update either single counters or combine several counters into one counter by using different kind of mathematical operations (addition, subtraction, multiplication and division). When the whole account file is collected, the centralised counter handling block 5 gives a command to the updating block 2 to release the account file. After that the updated backup memory (combined counter file) is stored on a non-volatile memory, e.g. on a hard disk. This process is repeated as many times as there are updating blocks (and account files) in the network element. Further, according to the time interval defined in the control memory 6, the centralised counter handling block 5 transfers counters from a compiled counter file via a backup and transfer block 3 to a post-processing.

It is obvious to a person skilled in the art that with the advancement of technology, the basic idea of the invention may be implemented in various ways. The invention and its embodiments are thus not limited to the examples described above. Instead, they may vary within the scope of the claims.

The invention claimed is:

1. A method comprising:
   recording application-specific data on a set of counters of an application in a network element;
   sending, by the application, a service request to an updating block for the set of counters;
   reserving, in response to the service request, resources of the updating block for updating changed counter data of the application;
   sending, by the application, an updating message to the reserved resources of the updating block to update changed counter data of said set of counters of said application;
   forming an accounting file using a two-part file structure which comprises an index file and a counter file, wherein said index file comprises indexes;
   associating individual ones of said indexes with individual counters of said counter file;
   receiving information of counters of said set of counters from a memory controlled by a user of said counters, wherein the information comprises a control file modified by the user of the counters to identify, to the resources of the updating block, both counters that are to be ignored and counters that are to be updated in said accounting file;
   identifying, with said information, an index of the index file associated with an individual counter of the counter file to be updated;
   based on said updating message, updating, by the resources of the updating block, said accounting file using changed counter data of the counters identified by the control file modified by the user of said counters,
   collecting said counter data from said accounting file by a centralized counter handling block to write into a transfer file,
   writing the collected counter data into said transfer file to further handle of said counter data, wherein said collecting of said counter data is controlled using information from said control file, and wherein the counters are to be taken into account by changing said information in said control file, and
   writing the collected counter data into said transfer file to further handle said counter data, wherein said collecting of said counter data is controlled using information from said control file and wherein the counters are to be taken into account by changing said information in said control file.

2. The method according to claim 1, wherein said control file is created, at least in part, by the user of the counters via a user interface connected to said network element.

3. The method according to claim 1, wherein the update message comprises at least one index field, and wherein a number of index fields in the update message specifies one of a one, two, or three dimensional assignment of the changed counter data for the index of the index file; and the method further comprising based on said updating message, updating only the indexes, of said accounting file, defined in the update message.

4. The method according to claim 1, wherein the collecting is according to a time interval defined in the control file for collecting said counter data.

5. The method according to claim 1, wherein each index comprises an offset value of the associated counter in the counter file.

6. The method according to claim 1, wherein the information of the control file is modifiable by the user of the counters to at least create a different mathematical operation for a counter.

7. The. method according to claim 1, further comprising said service request including updating parameters which are selected from a group of parameters comprising an identity of said application, a number of indexes, a number of counters in said set of counters, and an assignment of said indexes in said accounting file.

8. The method of claim 1, further comprising:
   controlling functionality of said centralized counter handling block by contents of said control file.

9. The method according to claim 8, further comprising specifying said contents of said control file according to specific needs of each application in said network element.

10. The method of claim 1, further comprising:
    updating a backup of used counters into a compiled counter file.

11. The method according to claim 1, further comprising:
    connecting a set of updating blocks of the network element into one centralized counter handling block; and collecting all counter data from all applications in said network element by said one centralized counter handling block according to the contents of said control file.

12. The method of claim 1, further comprising:
    filtering said counter data in said updating block according to filtering information in a filter file.

13. An apparatus comprising:
    an application including a set of counters configured to record application-specific data and send a service request to an updating block for the set of counters;
    a processor configured, in response to the service request, to reserve a resource of said updating block to update changed counter data of the application; and
    to write said collected counter data said transfer file to further handle said data;
    the apparatus configured to form an accounting file using a two-part file structure which comprises an index file and a counter file, wherein said index file comprises indexes;
    the apparatus configured to associate individual ones of said indexes with individual counters of said counter file;
    the apparatus configured to receive information of counters of said set of counter from a memory controlled by a user of said counters, wherein the information comprises a control file modified by the user of the counters, wherein the information comprises a control file modified by the user of the counters an identify, to the resource of the updating block, both counters that are to be ignored and counters that are to be updated in said accounting file;
    the apparatus configured to identify, with said information, an index of the index file associated with an individual counter of the counter file to be updated;
    an accounting memory configured, based ob said updating message, to update said accounting file using changed counter data of the counters identified by the control file modified by the user of said counters;
    wherein said apparatus is configured to collect said counter data from said accounting file to write into a transfer file, and to write said collected counter data into said transfer file to further handle said data, wherein the collecting of said counter data is controlled using information from said control file, and wherein the counters are to be taken into account by changing information in said control file.

14. The apparatus according to claim 13, wherein said control i file is created, at least in part, by the user of the counters via a user interface connected to said apparatus.

15. The apparatus according to claim 13, wherein the update message comprises at least one index field, and wherein a number of index fields in the update message specifies one of a one, two, or three dimensional assignment of the changed counter data for the index of the index file; and the method further comprising based on said updating message, updating only the indexes, of said accounting file, defined in the update message.

16. The apparatus according to claim 13, wherein the collecting is according to a time interval defined in information in said control file for collecting said counter data.

17. The apparatus according to claim 13, wherein the service request from the application includes parameters which indicate an identity of the application, a number of indexes for the counters, a number of counters in said set of counters, and an assignment of indexes in said accounting file.

18. The apparatus according to claim 13, further comprising a set of processors configured to collect all counter data from all applications.

19. The apparatus according to claim 13 wherein the information of the control file is modifiable by the user of the counters via a user interface connected to said apparatus in order to at least create a different mathematical operation for a counter.

20. The apparatus according to claim 13 wherein each index comprises an offset value of the associated counter in the counter file.

21. A computer-readable storage medium encoded with instructions configured to control a processor to perform a process, the process comprising:

recording application-specific data on a set of counters of an application in a network element, reserving, in response to the service request, resources of the updating block for updating changed counter data of the application;

sending, by the application, an updating message to the reserved resources of the updating block to update changed counter data of said set of counters;

forming an accounting file using a two-part file structure which comprises an index file and a counter file, wherein said index file comprises indexes;

associating individual ones of said indexes with individual counters of said counter file;

receiving information of counters of said set of counters from a memory controlled by a user of said counters, wherein the information comprises a control file modified by the user of the counters to identify, to the resources of the updating block, both counters that are to be ignored and counters that are to be updated in said accounting file;

identifying, with said information, an index of the index file associated with an individual counter of the counter file to be updated;

based on the updating message, updating, by the resources of the updating block, an accounting file using changed counter data of the counters identified by the control file modified by the user of said counters; and collecting said counter data from said accounting file by a centralized counter handling block to write into a transfer file; and writing counter data from said set of counters into said transfer file to further handle said counter data, wherein said collecting of said counter data is controlled using information from said control file and wherein the counters are to be taken into account by changing said information in said control file.

* * * * *